United States Patent [19]

Hsu et al.

[11] 4,406,763

[45] Sep. 27, 1983

[54] SEPARATION OF CARBON ISOTOPES

[75] Inventors: David S. Y. Hsu, Clinton; Thomas J. Manuccia, Jr., Silver Spring, both of Md.

[73] Assignee: The United States of America as represented by the Secretary of the Navy, Washington, D.C.

[21] Appl. No.: 250,997

[22] Filed: Apr. 3, 1981

[51] Int. Cl.³ .................. C01B 31/00; B01D 59/00
[52] U.S. Cl. ........................... 204/158 HA; 423/3; 204/162 HE
[58] Field of Search .............. 423/3; 204/157.1 R, 204/162 HE, 158 HA

[56] References Cited

U.S. PATENT DOCUMENTS 4,097,384 6/1978 Coleman et al. .................. 250/527
4,120,767 10/1978 Bittenson et al. ................ 204/158 R
4,140,978 2/1979 Bischel et al. .................... 331/94.5 G

OTHER PUBLICATIONS

Hsu et al., "Deuterium Enrichment by CW $CO_2$ Laser Induced Reaction . . . ", Appl. Phys. Lett. 33(11), Dec. 1978, pp. 915–917.
Hsu et al., Advances in Laser Chemistry, (1978), pp. 88–92.
Chien et al., J. Phys. Chem., 80:13, 1405, (1976).
Marling, J. Chem. Phys., 66, 4200, (1977).
Mayer et al., Appl. Phys. Lett 17, 516, (1970).

Primary Examiner—Brooks H. Hunt
Attorney, Agent, or Firm—Robert F. Beers; William T. Ellis; Thomas E. Mcdonnell

[57] ABSTRACT

Isotopes of carbon are separated by irradiating an isotopic mixture of methyl fluoride with a laser tuned to an absorption of one of the isotopes, reacting the isotopic mixture with atomic bromine, whereby the excited isotopic form of methyl fluoride reacts at a faster rate than the other form, and separating the products.

10 Claims, 4 Drawing Figures

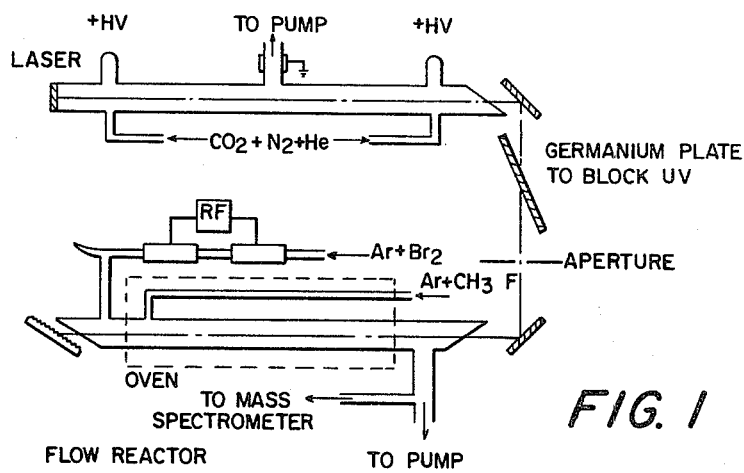
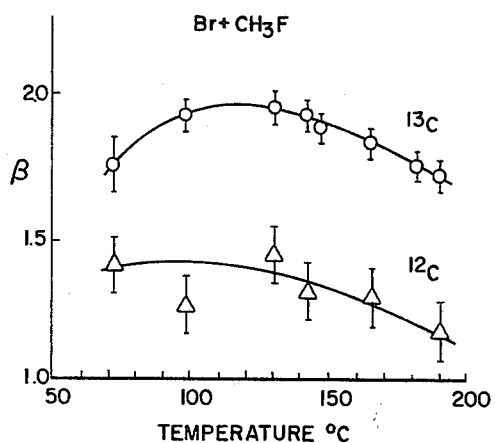
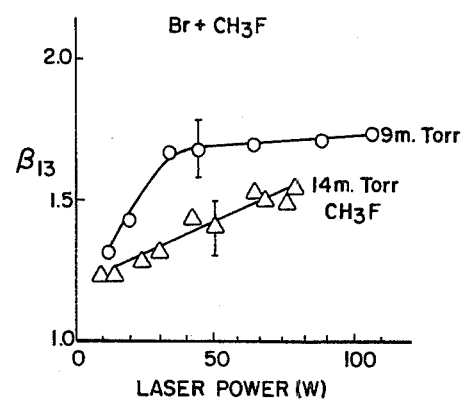
FIG. 2
FIG. 3
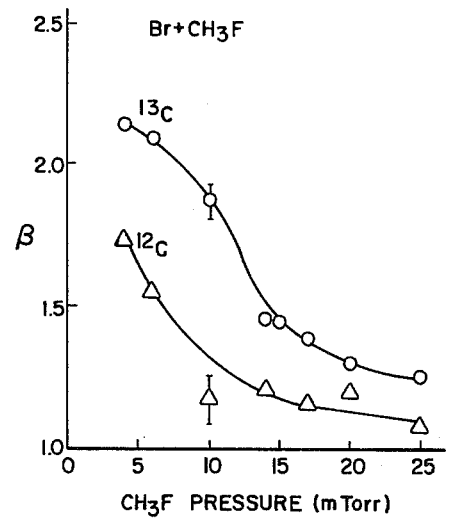
FIG. 4

SEPARATION OF CARBON ISOTOPES

BACKGROUND OF THE INVENTION

The present invention pertains generally to isotope separation and in particular to laser-induced separations of carbon isotopes.

The objective of laser-induced separations of isotopes is to selectively transform molecules of one isotope into an enriched chemically distinct species which is capable of being chemically separated by subsequent processing and hence enriched. Generally, this type of isotope separation involves a preferential vibrational excitation of molecules of the desired isotope, followed by a chemical reaction, a uv photodissociation, or photoionization.

Even if molecules containing a certain isotope absorb energy preferentially, isotopic specificity can be destroyed by intermolecular VV energy exchanges between the various isotopically substituted species or by bulk heating. Interisotope VV transfer is near-resonant and therefore very fast, typically on the order of ten gas kinetic collisions. For a given molecule, it is very difficult to find a reaction which proceeds at a rate comparable to a VV transfer, simultaneously shows appreciable vibrational enhancement and yields a product which does not undergo a rapid chemical isotope exchange with the reagents. Bulk heating, due to VT relaxation of the excited species, increases the rate of the nonselective thermal reaction and therefore can completely mask the vibrational component of the reactivity change.

Besides isotope specificity, an isotope separation must have several additional characteristics in order for it to have any commercial potential. Due to energy costs, isotopic specificity occurring at excitations among the lowest two or three vibrational levels is most desirable. The separation must also be pressure scalable to be commercially viable. In in other words, it must be able to operate over a wide range of pressures. Particularly pressures above those typically employed in the research laboratory.

Laser-induced separations involving spontaneous photodissociations due to vibrational excitation at low-lying vibrational levels are few. Large fractionation ratios are disclosed for the decomposition of $D_3BPF_3$ and $H_3BPF_3$ in K-R Chien and S. H. Bauer, J. Phys. Chem. 80(13), 1405 (1976). This method utilizes a direct absorption of photons by a costly reagent and thus can only proceed if a laser can operate at the absorption band and if no excessive bulk heating of the reactant occurs.

The separation techniques disclosed in U.S. Pat. No. 4,097,384, issued to Coleman et al. on June 27, 1978, includes dissociating an uranium ligand as well as the more common scheme of a subsequent preferential reaction of the selectively excited molecules with another reactant. This method also relies on a direct absorption of photons to obtain a vibrational excitation of the molecule and has the same problems previously discussed. The necessity of having a laser operate in the fundamental absorption band of the molecule being excited is attempted to be solved by relying on absorptions at the overtones. These absorptions are relatively small and thus scalability to larger system is difficult.

In J. Marling, J. Chem. Phys. 66, 4200 (1977) carbon isotopes are separated by irradiating with visible/UV excitation to dissociate formaldehyde. The process has a poor energy efficiency because of the expensive UV photons and reagent regeneration.

The separation method in S. W. Mayer, M. A. Kwok, et al. Appl. Phys. Lett. 17 516 (1970) is a direct absorption method. An H:D separation is achieved through an isotopically specific reaction in a $CH_3OH:CH_3OD:Br_2$ gas-phase mixture at a pressure of about 100 torr which has been excited with a 90 w cw HF laser. All attempts to reproduce the results have failed due probably to bulk heating of the gas mixtures, VV transfer, and chemical isotopic scrambling between reagents and products.

As was stated previously, a major cause for failures of isotope separation attempts is the rapid rate of intermolecular VV energy exchanges between isotopically substituted species exceeding the rate of the chemical differentiation step. This whole question has been left unaddressed in previous research. It has been pointed out that if the total rate of deactivation of the excited vibration is comparable to or faster than the rate of interisotopic VV exchange, isotopic selectivity on a cw basis is preserved as well as establishing pressure scalability. This concept has been termed the competing-deactivation technique. In Manuccia et al., J. Chem. Phys. 68,(5), p. 2271, Mar. 1, 1978, this technique is used to enrich $^{79}Br$ or $^{81}Br$ in products of the radical chain reaction of chlorine atoms with natural isotopic-abundance methyl bromide by exciting the respective $CH_3Br$ is a low-pressure, discharge flow reactor intracavity to a $CO_2$ laser.

A deuterium separation by the competing-deactivation technique is disclosed in Hsu et al. Advances in Laser Chemistry, ed. by A. H. Zewail, Springer Series in Chemical Physics. p. 88–92, and in Hsu et al. Appl. Phys. Lett. 33(11), 915–17, (Dec. 1, 1978), A cw Cw $CO_2$ laser is used to vibrationally excite $CH_2D_2$ in a mixture of $CH_2D_2$ and $CH_4$ while an intentional VT deactivation by argon atoms and the reaction walls competes with interisotope VV transfers to produce a gas sample in which the $CH_2D_2$ is excited and the $CH_4$ remains less excited on a steady state basis. A reaction of this gas mixture with chlorine atoms and molecules forms a stable product, deuterated methyl chloride, enriched in deuterium by up to 72%. This method can be considered technically important because it is the most energy efficient laser separation for deuterium to date. The projected energy efficiency is, however, below that of the current $H_2S/H_2O$ process because of the high energy coasts of pumping, refrigeration and reactant regeneration imposed by use of the thermoneutral reaction.

SUMMARY OF THE INVENTION

It is, therefore, an object of the present invention to separate carbon isotopes by using a relatively inexpensive and readily available feedstock by a highly energy-efficient, pressure-scalable process having a high enrichment factor.

A further object of the present invention is to separate carbon isotopes through a substantially more energy efficient endothermic reaction, of approximately 15 kcal/mole.

A still further object of the present invention is to separate carbon isotopes by an inexpensive photochemical technique requiring a simple cw $CO_2$ laser.

These and other objects are achieved by irradiating at a saturating energy flux, a mixture of two carbon-isotope species of an methyl fluoride with a laser tuned to an absorption band of one of the isotopic forms of an methyl fluoride, reacting the isotopic mixture with atomic bromine in the presence of a nonabsorbing deactivating gas sufficient to provide adequate VT and VVT deactivation of the isotopic mixtures and finally separating the chemically distinct products.

BRIEF DESCRIPTION OF THE DRAWINGS

FIG. 1 is a schematic representation of the reaction system utilized to demonstrate the practice of the present invention.

FIG. 2 is a graphical illustration of the wall-temperature-dependence of carbon-isotope enrichment factors.

FIG. 3 is a graphical illustration of the laser-power dependence of carbon-13 enrichment factor at two $CH_3F$ partial pressure and a wall temperature of 185° C.

FIG. 4 is a graphical illustration of carbon-13 and carbon-12 enrichment factors at different $CH_3F$ partial pressures obtained at 147° C. and a laser of 16 W/cm$^2$.

DETAILED DESCRIPTION OF THE INVENTION

In view of the high enrichment and an analysis of the experimental data, it is observed that under the conditions of the present isotope separation technique with the laser tuned to the $^{13}CH_3F$ species, vibrational excitation remains largely in $^{13}CH_3F$, thereby permitting an isotope enrichment in the products due to the bromine-methyl fluoride-reaction rate dependence on the degree of vibrational excitation, because an efficient removal of $^{12}CH_3F(v=1)$ molecules competes with the rapid interisotope VV transfer and thus prevents the population of $^{13}CH_3F(v=1)$ and $^{12}CH_3F(v=1)$ from equalizing. This competition between all of the processes which pump the non-absorbing isotope and those processes which deactivate that isotope extends to higher vibrational states of $^{12}C_3F$. Isotopic selectivity is thus gained at the expense of efficient photon utilization. This method obtains enrichment, even though individual deactivation rate constants of the laser-pumped molecule, $^{13}C_3F$, are essentially identical to the corresponding rate constants for the molecule $^{12}CH_3F$.

One deactivation process, occurring in the present isotope separation, is VT deactivation which is discussed in, e.g., D. S. Y. Hsu and T. J. Manuccia, *Appl. Phys. Lett.* 33, . 915 (1978). A second and more important process is VVT deactivation, such as $$CH_3F(4v_3) + M_o \rightarrow CH_3F(v_3+v_4) + M_o + (E = 50 \text{ cm}^{-1})$$

wherein $M_o$ represents gas molecules present, including methyl fluoride or any solid surface (e.g., walls). Surprisingly collisions between $CH_3F$ molecules not only provide VV up-pumping but also VT and VVT deactivation. Thus, some degree of isotopic selectivity is maintained, even in the absence of any added deactivating gas. These deactivations are very fast since the density of states rises rapidly with increasing excitation and thus provide the requisite loss terms.

Because the laser-pumped isotopic methyl fluoride has a 1000 cm$^{-1}$ "headstart" in the VV-collisional ladder-climbing process and the deactivation processes preserve this disequilibrium, isotopic selectivity is established in states considerably above v=1, despite the many opportunities for interisotope equilibration.

During an isotope separation, the following reactions occur:

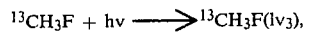

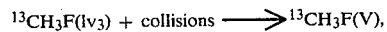

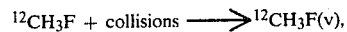

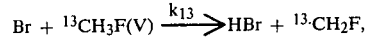

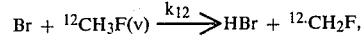

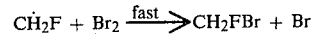

In the above equations, the higher and lower vibrational degrees of excitation are indicated by V and v respectively.

The equations (confirmed by the examples to follow) show that the "head start" for $^{13}CH_3F$ provided by laser excitation and the VVT energy removal processes does result in a steady state in which a greater degree of vibrational excitation resides in $^{13}CH_3F$ than in $^{12}CH_3F$. Carbon-13 is enriched because $k_{13} > k_{12}$, i.e., the reaction rate is an increasing function of the degree of vibrational excitation.

The above discussion is only a partial explanation of the complex chemistry of the present invention. It is given by way of a possible explanation of the present invention and is not intended to limit the invention to any specific kinetic scheme. It should be noted that for any reaction scheme to effect isotope separation, these reactions, along with all of the excitation, transfer of excitation, deactivation and reaction events occurring between the introduction of the reactants into the reactor and the formation of the products, must produce an accumulation of isotope effects which results in a segregation of isotopes, a result being entirely unpredictable a priori.

In practice a deactivating gas mixture of carbon-12 and -13 methyl bromide, and bromine atoms are introduced into a reaction system. The reaction system is kept at a temperature from about 0° C. to about 200° C. with a commercial preferred range from 70° to 150° C., a total pressure from about 1 Torr to about 10$^4$ Torr with a commercially preferred range from 100 to 1000 Torr, and a reactant partial pressure from about 10$^{-3}$ to about 10$^2$ Torr with a commercially preferred range from 1 to 50 Torr. Because of the constancy of the ratio of the pumping to deactivational collisional rate the $\beta$ is independent of the increases in total system pressure (at counterfractional composition) thus the desired pressure scalability is had.

The process of this invention can be easily operated in a continuous basis rather than on a batch basis. The gases are pumped, at appropriate flow rates at the above pressures, through a flow cell which is maintained in the above temperature range by, e.g., an oven. Regardless of whether the process is batch or continuous the volume percent of the deactivator is from 1 to 95 percent depending on the VT and VVT rates of the deactivation, its heat transfer properties, and the exact mechanical configuration of the system.

The size and shape of the flow cell depend on the power and output beam quality of the particular laser, and reagent volumetric flow. Any shape and size which provide a uniform flux and allow a saturated or nearly saturated enrichment of the reagent is gas are preferred. If the flow cell is constructed of a material (e.g., pyrex) which promotes recombination of bromine atoms, it is to be coated with a substance which inhibits recombination (e.g., phosphoric acid).

The laser used to excite the isotopic methyl fluoride species should, of course, match the absorption band of the absorbing species, i.e., be capable of pumping the fundamental $v_3$ mode of the desired isotope. A multiple-line or mode or a single-line or mode laser can be used. As stated above the power of the laser should be sufficient to nearly saturate the absorption which requires a power density of about 1 to about $10^3$ watts/cm$^2$ for small scale. For the present method, a cw $CO_2$ laser is preferred. The preferred location of the laser is external to the flow cell for commercial operation, however, any arrangement which provides a uniform and sufficient irradiation can be used (e.g., intracavity or multiple lens).

The present technique permits a great latitude in designing the reaction system. Total and reagent partial pressures and flow rates, laser power, reaction systems design are all interelated and vary greatly. A few sample runs of any system would quickly determine the conditions which would most economically produce saturation, (the point at which the enrichment does not increase). For example a low total flow rate and pressure would require a small laser flux and thus little energy to reach saturation, but the throughput would be extremely small, thereby requiring a long run (therefore much energy and time) to obtain the desired amount of isotope.

The stable end products (hydrogen bromide, $^{12}CH_3FBr$, and $^{13}CH_3FBr$) are separated by any of the many standard chemical fractionization processes, for example, an initial scrubbing with water followed by successive partial liquidifications of the gas stream.

The methyl fluoride reactant used in the present isotope separation is a mixture of carbon-12 and carbon-13 methyl fluoride. The preferred reactant in the initial feedstock is carbon-12 methyl fluoride with a natural abundance of carbon-13 methyl fluoride.

Bromine atoms can be produced by any type of dissociation technique, e.g., by an rf discharge or by a laser. The bromine atoms can be generated before their introduction in the reaction site or they can be generated in situ in the reaction mixture by irradiation with a laser operating in the dissociative visible absorption band of bromine. The amount of molecular bromine can vary widely, depending on the exact method and the parameters of the dissociation process used and the wall recombination rate so as to limit the consumption of $^{13}CH_3F$ to 10 to 60 percent. If the amount is about the stoichiometric amount or less, the output is seriously reduced. The amounts preferred, for economic and other reasons, are typically from 10 to 100 times the stoichiometric amount, based on a single substitution.

The reactants are mixed with a deactivating gas so that the VT and VTT deactivation rate is faster than the VV interisotopic energy transfer. The deactivating gas may be any gas inert to the ongoing chemical reaction and nonabsorptive to the laser irradiation. Examples of the deactivating gas are sulfur hexafluoride, nitrogen, and the noble gases. The amount of deactivating gas is sufficient to compete with the VV transfers.

If bulk heating or insufficient flow velocity is encountered, it may be advantageous to have independent control of these parameters by the addition of a diluent gas. A diluent gas is inert to the ongoing chemical reaction, does not absorb the laser irradiation, and has a slow deactivation rate constant. With some intermediate gases, e.g., argon, they can be used as both a deactivator gas and a diluent gas, unlike krypton which can only be used as a deactivating gas.

The following examples use the reactor system shown in FIG. 1. Briefly, the reactor was a 2 m long, 25 mm inner diameter Pyrex tube internally coated with phosphoric acid and positioned intracavity to a conventional cw $CO_2$ laser. Atomic bromine is generated by rf discharge of $Br_2+Ar$ in a phosphoric-acid-coated quartz side arm. The $^{13}CH_3F$—$^{12}CH_3F$ mixture, premixed with Ar, was injected downstream in the irradiation zone. Further details of the system are given in Hsu et al. *Chem. Phys. Lett.* 76:1, pp. 16–20 (November 1980) which is hereby incorporated by reference.

The laser was grating tuned to excite the $v_3$ mode (C—F stretch) of $^{13}CH_3F$ or of $^{12}CH_3F$ at will. The $^{13}CH_3F$ molecule absorbs the P(32) line of the 9.6 $\mu$m $CO_2$ band ($\alpha=0.25$ cm$^{-1}$ Torr$^{-1}$) and the $^{12}CH_3F$ molecule absorbs the 9.6 $\mu$m P(20) line ($\alpha=0.018$ cm$^{-1}$ Torr$^{-1}$).

The reagent flow rates unless varied, for the examples were 15.5 Torr cm$^3$s$^{-1}$ of $^{13}CH_3F$—$^{12}CH_3F$, 15.0 Torr cm$^3$s$^{-1}$ of $Br_2$, and 1600 Torr cm$^3$s$^{-1}$ of Ar. For these flow rates, the total pressure was 1.1 Torr with a $CH_3F$ partial pressure of 10.0 m Torr and a mean flow velocity of 3.0 m/s.

The ratio of the amplitudes of the mass peaks of the pair of carbon isotope-bearing reaction products $^{12}CH_2F^{81}Br$ and $^{13}CH_2F^{81}Br$ was monitored on a repetitively scanned quadrupole mass spectrometer feeding a two-channel boxcar integrator with an internal ratiometer.

The enrichment factor for the isotopes is defined as the isotope ratio of the product divided by the isotope ratio of the reagent. The isotope ratio in the reaction products was determined by monitoring the amplitude ratios of the parent peaks at m/e=114 and 115.

The following examples are given to better illustrate the practice of the present invention and are not intended to limit the disclosure or the claims to follow in any manner.

EXAMPLE I $^{13}CH_3F:^{12}CH_3F = 1:4$

Wall Temp. = 70°–190° C.

The enrichment factors for $^{12}CH_3F$ and $^{13}CH_3F$ were measured at several wall temperatures which gave an accurate reflection of the translational and rotational temperature of the gas under the present reaction conditions. The laser flux was at 16 w/cm$^2$ and the partial pressures for $^{13}CH_3F$ and $^{12}CH_3F$ were 2.0 mTorr and 8.0 mTorr respectively.

The results are summarized in FIG. 2, wherein circles represent $\beta_{13}$ and triangles represent $\beta_{12}$ and show only a slight temperature dependence of the enrichment. This demonstrates that the enrichment is mainly because of vibrational enhancement and that isotopically non-selective thermal reactions being to reduce the enrichment factors only at the higher temperature. The carbon-12 enrichment factors are less than those for carbon-13. Very likely, this is because in $^{12}CH_3F$, the degree of vibrational excitation is lower than that in $^{13}CH_3F$, due to the 14-fold smaller absorbtion coefficient of this species.

EXAMPLE II $^{13}CH_3F:^{12}CH_3F = 1:4$

Laser Power = 1-110 W

The enrichment factor for $^{13}CH_3F$ was measured at several laser power outputs, at two $CH_3F$ partial pressures and at a wall temperature of 185° C. Here, 100 W of total power approximately equaled 20 W/cm$^2$.

The results are summarized in FIG. 3 wherein circles represent 9 mTorr partial pressure and triangle represent 14 m Torr partial pressure. The data demonstrate that higher laser intensities or higher absorption coefficients than expected are needed to achieve saturation of the vibrational energy content of the molecules. When the $CH_3F$ partial pressure is changed from 9 mTorr to 14 mTorr, at any fixed laser intensity, the carbon-13 enrichment factor is reduced, and saturation behavior becomes less evident. This is most likely due to an increase in the ratio of VV to VT overall) rates (i.e., molecules sec$^{-1}$ cm$^{-3}$) as well as the usual increase in the VT rate itself. In any case, a simple two-level saturation intensity calculation based on the absorption coefficient and the v=1 deactivation rates predicts a saturation intensity orders of magnitude lower than the level actually observed.

EXAMPLE III $^{13}CH_3F:^{12}CH_3F = 1:4$ $CH_3F$ Pressure = 4-25 m Torr

Enrichment factors for both isotopic forms were measured at different $CH_3F$ pressures. The laser flux was 16 w/cm$^2$ and the wall temperature was 147° C.

The results are summarized in FIG. 4. Again a decrease is observed as the $CH_3F$ pressure is increased because of a decrease in the fraction of vibrationally excited molecules for the same reason mentioned before. On the other hand, as can be seen by inspection of the various terms in any rate equations model for such a pumping/deactivation situation, it should be possible to maintain a constant enrichment factor as the $CH_3F$ pressure is increased, so long as the laser intensity and the deactivation rate are proportionally increased.

In conclusion, the above examples show the contrast to previous techniques. The fundamental vibrational state directly excited by the laser in the present technique is not the reacting state and the state where isotopic selection occurs. The reacting state is much higher than the fundamental state and is reached by collisional up-pumping. Isotopic selectivity is preserved in the higher state by VVT deactivation which is sufficient in quantity because of the choice of particular concentrations of the reactants and deactivation gases. The up pumping in conjunction with the continued isotopic selectivity allows the present technique to separate isotopes by endothermic reaction systems in which the laser-pumped fundamental state is not sufficiently reactive.

Obviously, many modifications and variations of the present invention was possible in light of the above teachings. It is therefore to be understood that within the scope of the appended claims the invention may be practiced otherwise than as specifically described.

What is claimed is:

1. A method for separating carbon isotopes which comprises:
   mixing the two isotopic species of methyl fluoride, bromine atoms, and a deactivating gas;
   irradiating at a saturating level flux with a laser tuned to an absorption band of one of said isotopic species of methyl fluoride, thereby vibrationally exciting said absorbing species;
   reacting methyl fluoride with bromine, whereby absorbing species reacts at a faster rate than said non-absorbing species; and
   separating the products.

2. The method of claim 1 wherein bromine atoms are generated in situ in the mixture.

3. The method of claim 1 wherein bromine atoms are generated prior to admixing with methyl fluoride.

4. The method of claim 2 wherein said deactivating as is argon.

5. The method of claim 3 wherein said deactivating gas is argon.

6. The method of claim 4 wherein said carbon isotopic species being irradiated is $^{13}CH_3F$.

7. The method of claim 5 wherein said carbon isotopic species being irradiated is $^{13}CH_3F$.

8. The method of claim 1 wherein a diluent gas is included.

9. The method of claim 2 wherein a diluent gas is included.

10. The method of claim 3 wherein a diluent gas in included.

* * * * *